United States Patent [19]

Misage et al.

[11] Patent Number: 4,781,241
[45] Date of Patent: Nov. 1, 1988

[54] HEAT EXCHANGER FOR FUEL CELL POWER PLANT REFORMER

[75] Inventors: Robert Misage, Manchester; Glenn W. Scheffler, Tolland; Herbert J. Setzer, Ellington; Paul R. Margiott; Edmund K. Parenti, Jr., both of Manchester, all of Conn.

[73] Assignee: International Fuel Cells Corporation, South Windsor, Conn.

[21] Appl. No.: 90,305

[22] Filed: Aug. 27, 1987

[51] Int. Cl.$^4$ .................. F28D 7/08; H01M 8/04; H01M 8/18

[52] U.S. Cl. .................. 165/1; 165/47; 165/140; 429/17; 429/20; 429/26

[58] Field of Search .............. 165/1, 47, 140; 429/13, 429/26, 16, 17, 20

[56] References Cited

U.S. PATENT DOCUMENTS

| | | | |
|---|---|---|---|
| 3,615,850 | 10/1971 | Chludzinski | 429/20 |
| 4,004,947 | 1/1977 | Bloomfield | 429/17 |
| 4,333,992 | 6/1982 | Healy | 429/26 |
| 4,362,788 | 12/1982 | Maru et al. | 429/17 |
| 4,670,359 | 6/1987 | Beshty et al. | 429/17 |

FOREIGN PATENT DOCUMENTS 0082973  5/1982  Japan .................. 429/17

Primary Examiner—Albert W. Davis, Jr.
Assistant Examiner—John K. Ford
Attorney, Agent, or Firm—William W. Jones

[57] ABSTRACT

A heat exchanger uses the heat from processed fuel gas from a reformer for a fuel cell to superheat steam, to preheat raw fuel prior to entering the reformer and to heat a water-steam coolant mixture from the fuel cells. The processed fuel gas temperature is thus lowered to a level useful in the fuel cell reaction. The four temperature adjustments are accomplished in a single heat exchanger with only three heat transfer cores. The heat exchanger is preheated by circulating coolant and purge steam from the power section during startup of the latter.

7 Claims, 4 Drawing Sheets

HEAT EXCHANGER FOR FUEL CELL POWER PLANT REFORMER

DESCRIPTION

1. Technical Field

This invention relates to a heat exchange assembly for use in a fuel cell power plant, and more particularly, to a heat exchanger which utilizes heat from reformed power plant fuel to preheat raw fuel and to superheat steam prior to mixing the raw fuel and the steam in the reformer.

2. Background Art

The fuel which is used in the electrochemical generation of electricity in commercial forms of fuel cell power plants is catalytically converted or reformed from a raw hydrocarbon fuel, such as methane, propane, naphtha, heating oils or the like, to a hydrogen-enriched fuel gas. In the reforming then mixed with steam. The fuel-steam mixture is then passed through catalyst beds in the reformer where it is catalytically converted to the hydrogen-enriched fuel gas used in the electrochemical reaction. The steam used in this reaction will preferably be superheated so as to ensure that no condensation will occur. The steam which is used in this reaction may be derived from the water coolant which is used to cool the fuel cell stacks in the power plant.

The superheating of the steam and the preheating of the raw hydrocarbon fuel is accomplished in the prior art by the use of separate heat exchangers which, once operation of the power plant has begun, derive their heat from reformer burners. These heat exchangers must be preheated for startup by electric heaters to ensure that no water will enter the reformer from the steam core, and to ensure that any condensed water in the reformer effluent lines is evaporated before the reformer begins to produce new reformed fuel.

DISCLOSURE OF INVENTION

The heat exchanger of this invention is a multifunctional device which performs four different heat exchange functions with three different flow cores contained in a single housing. All of the flow cores are thermally interconnected by heat transfer fin plates. The heat exchanger of this invention reduces the temperature of the reformer effluent fuel gas to temperatures suitable for the shift converter operation which precedes transferring the fuel gas to the stack. This heat exchanger also produces some of the steam used in the reformer, superheats the steam and preheats the raw hydrocarbon fuel prior to reforming the latter. The heat exchanger of this invention is brought to operating temperatures on startup by coolant from the stack and by purging steam, thus obviating the need for separate electric startup heaters.

It is therefore an object of this invention to provide an improved heat exchanger for use in an fuel cell power plant which does not require auxiliary heaters for startup of the power plant.

It is a further object of this invention to provide a heat exchanger of the character described which performs four necessary heat exchanger functions with three flow cores mounted in a single housing.

It is another object of this invention to provide a heat exchanger of the character described which is preheated during power plant startup by hot coolant from the power section of the power plant.

These and other objects and advantages of the invention will become more readily apparent from the following detailed description of a preferred embodiment thereof when taken in conjunction with the accompanying drawings.

BEST MODE FOR CARRYING OUT THE INVENTION

Figure 1:
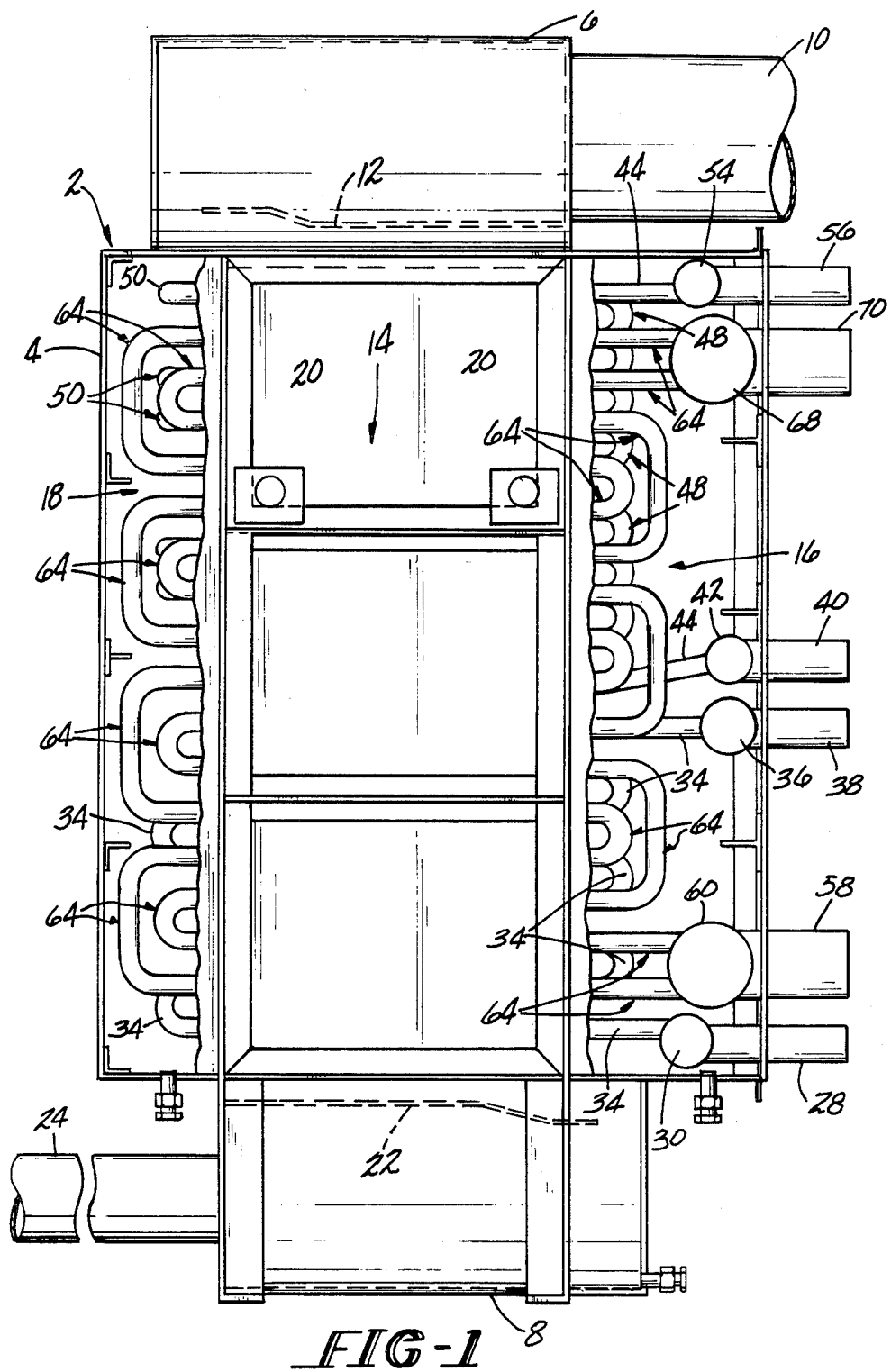
FIG. 1 is an elevational view of the heat exchanger of this invention, partially broken away for purposes of clarity.
Figure 2:
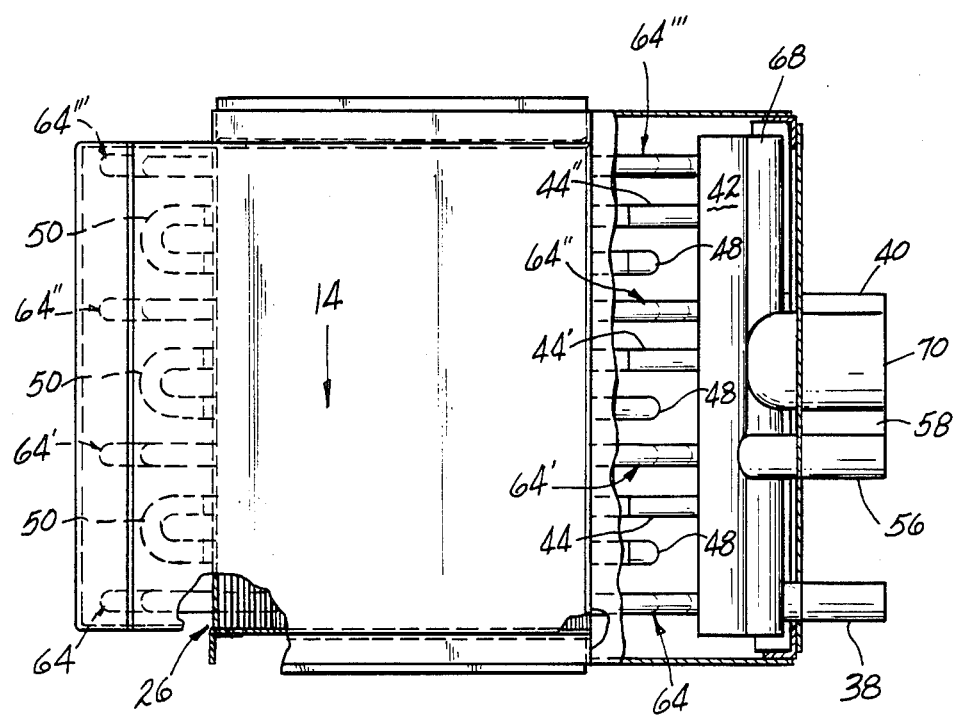
FIG. 2 is top plan view of the heat exchanger partially broken away for purposes of clarity.
Figure 4:
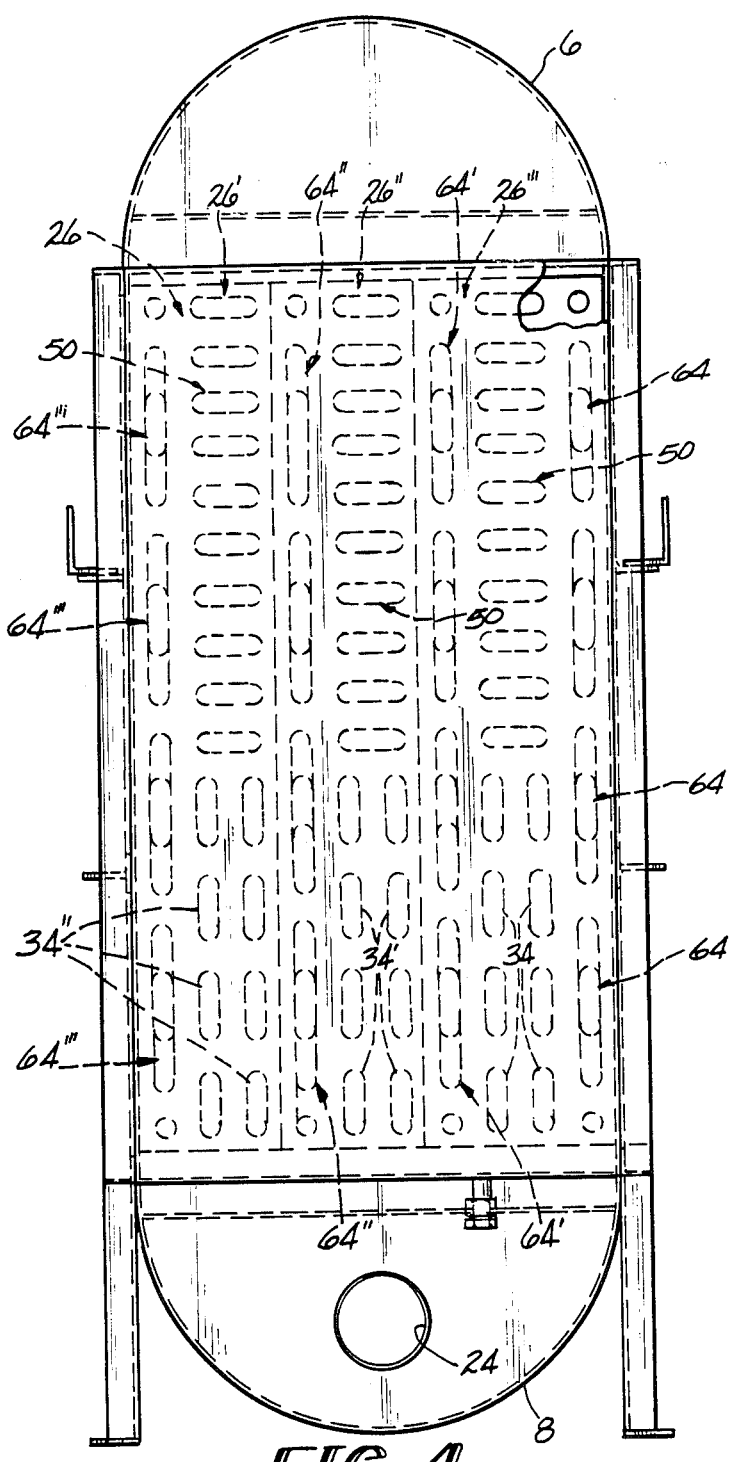
FIG. 4 is an elevational view similar to FIG. 3 but seen looking from the left hand side of FIG. 1.

Referring now to the drawings, the heat exchanger, denoted generally by the numeral 2 has a single housing 4 with an upper inlet shroud 6 and a lower outlet shroud 8. An inlet pipe 10 carries hot reformer effluent from the catalytic reformer (not shown) to the inlet shroud 6. An inlet baffle 12 is interposed between the interior of the inlet shroud 6 and the interior of the housing 4 and is operable to evenly distribute the gases flowing into the housing 4 so that the temperatures will be evenly distributed over the heat exchange core portion in the housing 4. The interior of the housing 4 is divided into a central core portion 14 through which hot gases can flow from the inlet shroud 6 to the outlet shroud 8, and manifold and flow reversal chambers 16 and 18 on either side of the core portion 14. The chambers 16 and 18 are closed off from the core portion 14 by end plates 20. An outlet baffle 22 controls the flow rate of the reformed fuel gas from the core portion 14 to the outlet shroud 8. As will be noted from FIG. 2, the core portion 14 of the assembly is filled with heat exchange fin plates 26, which plates 26, as shown in FIG. 4, are divided into three columns 26', 26" and 26"'.

Figure 3:
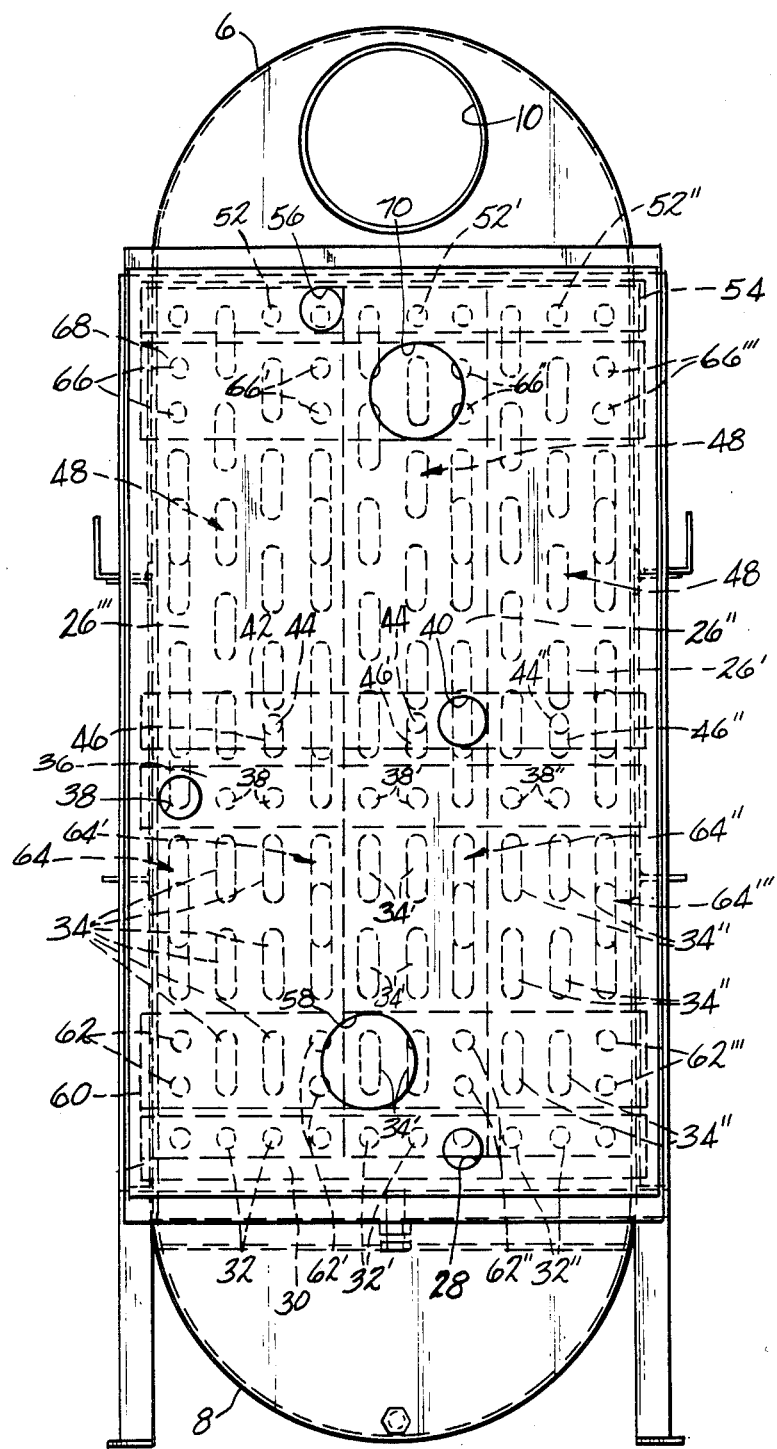
FIG. 3 is an elevational view of the heat exchanger as seen looking from the right hand side of FIG. 1.

With respect to the various fluids that flow through the heat exchange tubes in the housing 4, a portion of the power plant coolant water is brought to the heat exchanger 2 via inlet conduit 28 which opens into a coolant water inlet manifold 30 in the housing 4. There are three pairs of outlets 32, 32' and 32" in the coolant water inlet manifold 30 which open into three pairs of parallel heat exchange tubes 34, 34' and 34". The heat exchange tubes 34 pass through the fin plates in the column 26"'; the tubes 34' pass through the fin plates in the column 26"; and the tubes 34" pass through the fin plates in the column 26'. The coolant water tube pairs 34, 34' and 34" empty into an outlet manifold 36 through ports 38, 38' and 38". The outlet manifold 36 empties into a conduit 38 which delivers the resultant water-steam mixture to a steam separator (not shown), where the steam phase is separated from the water phase. The steam phase is then returned from the separator, along with additional process steam, to the heat exchanger 2 through conduit 40 which opens into a steam inlet manifold 42 inside of the housing 4. There are three exit openings 44, 44' and 44" in the steam inlet manifold 42 which open into heat exchange tubes 46, 46' and 46" respectively. The tube 46 passes through the fin plate column 26"'; the tube 46' passes through the fin plate column 26"; and the tube 46" passes through the fin plate column 26'. The tubes 46, 46' and 46" follow a serpentine path with vertical bends 48 (shown in FIG. 3) and horizontal bends 50 (shown in FIG. 4) until each tube 46, 46' and 46" reaches outlet openings 52, 52' and 52" respectively in a steam outlet manifold 54 in the housing 4. A steam outlet conduit 56 leads from the manifold 54 toward the reformer (not shown). The raw hydrocarbon fuel to be preheated is brought into the heat exchanger 2 through a conduit 58 which opens into a hydrocarbon fuel inlet manifold 60 having four pairs of associated openings 62, 62', 62" and 62'". Respective pairs of heat exchange tubes 64, 64', 64" and 64'" extend from the fuel inlet manifold openings 62, 62', 62" and 62'" to corresponding openings 66, 66', 66" and 66'" in a raw fuel outlet manifold 68 disposed in the housing 4. A conduit 70 ducts the preheated raw hydrocarbon fuel toward the reformer (not shown) for admixture with the steam from the conduit 56.

It will be noted that by having the reformer effluent inlet 10 at the top of the heat exchanger 2 and the outlet 24 at the bottom, the upper portions of the heat exchanger will be progessively higher in temperature. It is also noted that the exit temperature of the steam and the raw fuel from the device can be approximately equal due to the unique set-up of the respective heat transfer cores, both of which are exposed to the same temperature reformer effluent gas. The incoming reformer effluent gas will be at a temperature of about 800° F. and the outgoing reformer effluent gas will be at a temperature of about 325° to about 375° F. The coolant water from the stack circulates only through the lower cooler half of the heat exchanger, and enters the manifold 30 at a temperature in the range of about 300° to about 350° F. By the time the coolant reaches the outlet manifold 36, its temperature will be in the range of about 340° to about 360° F. and it will have been converted to a two phase water-steam mixture. After separation, the steam phase will be mixed with other process steam and will reenter the heat exchanger 2 at a temperature of about 350° F. and it will traverse the hotter upper half of the core 14. The use of the double serpentine flow path with both vertical and horizontal bends increases the dwell time of the steam in the core 14 so that when the steam reaches the outlet conduit 56, its temperature will have been raised to about 500° to 700° F., whereby the steam will have become superheated. The raw hydrocarbon fuel traverses the entire height of the core 14 and is thus subject to both the coolest and the hottest zones in the core. The raw hydrocarbon fuel will enter the inlet manifold 60 at a temperature of about 150° F. and will exit the heat exchanger through the conduit 70 at a temperature in the range of about 500° to 700° F., the same as the superheated steam.

It will be noted that in the lower half of the heat exchanger core 14, two different gases or gas mixtures are circulated through the heat exchange tubes, and likewise, in the upper half of the core 14, two different gases or gas mixtures are circulated through the heat exchange tubes. Each column 26', 26" and 26'" of fin plates contacts both of the sets of circulating tubes in each half of the heat exchanger to transfer heat from tube to tube, as well as from the reformer effluent gas to the tubes. In this way, the incoming raw hydrocarbon fuel gas is heated not only by the reformer effluent flowing through the core, but also by the coolant water mixture flowing through the tubes 34, 34' and 34". Similarly, the reformer effluent is cooled by both the raw hydrocarbon fuel and the coolant water mixture. In the upper half of the core 14, the heated raw hydrocarbon fuel and the steam are further heated evenly by the hotter reformer effluent.

As previously noted, when the power plant is started up, the heat exchanger 2 will be preheated by hot coolant water flowing through the power plant coolant loop and through the tubes 34, 34' and 34". This coolant water will be heated sufficiently in the cell startup so that the mass of lower half of the heat exchanger core portion 14, will be preheated sufficiently above the initial reformer effluent gas dew point to prevent condensation. Likewise, the mass of the upper half of the heat exchanger core portion 14, will be preheated sufficiently by purging steam through tubes 46, 46', and 46'" to prevent condensation. All of this preheating and conditioning of the heat exchanger will be accomplished without the use of an electric heater in the heat exchanger.

It will be readily appreciated that the heat exchanger of this invention is a relatively compact device which performs four heat exchange functions properly and efficiently, which heat exchange functions are necessary to properly operate a fuel cell power plant. The four different constituents are thermally altered with three different manifold and flow tube assemblies mounted in a single housing and all interconnected by equivalent sets of heat exchange fin plates. Through flow of the constituents in the heat exchanger is accomplished without the need for any valves or flow regulators associated with the heat exchanger, using the prevailing pressure drops which occur in the fuel cell system. The heat exchanger can be preheated and preconditioned for operation without the need of any constituent heaters in the device, and merely by using hot water and steam produced by startup of the power section stack.

Since many changes and variations of the disclosed embodiment of the invention may be made without departing from the inventive concept, it is not intended to limit the invention otherwise than as required by the appended claims.

We claim:

1. A method of operating a heat exchanger in a fuel cell power plant, said method comprising the steps of:
   (a) providing a single heat exchanger housing having an inlet end, and outlet end and a medial portion between said inlet and outlet ends;
   (b) flowing reformed fuel from a reformer through said housing from said inlet end to said outlet end;
   (c) flowing raw hydrocarbon fuel through said housing from said outlet end to said inlet end in heat exchange relationship with said reformed fuel;
   (d) flowing coolant water from a power section of the power plant through said housing from said outlet end to said medial portion in heat exchange relationship with said reformed fuel;
   (e) flowing steam from the power plant through said housing from said medial portion to said inlet end in heat exchange relationship with said reformed fuel; and
   (f) said reformed fuel entering said inlet end at reformer temperatures and exiting said outlet end at power plant power section temperatures, said raw hydrocarbon fuel entering said outlet end at near ambient temperatures and exiting said inlet end at reformer temperatures, said coolant water entering said outlet end at power section temperatures and exiting said medial portion as two phase water-steam mixture, and said steam entering said medial portion at steam separator temperatures and exiting said inlet end at reformer temperatures.

2. The method of claim 1 further including the preliminary steps of preheating said housing with coolant water and purging steam during startup of the power plant power section.

3. The method of claim 2 wherein said preheating steps are operable to elevate the temperature in said housing sufficiently to evaporate any moisture left therein from a prior operating cycle of the power plant.

4. A heat exchanger assembly for use in controlling fluid temperatures in a fuel cell power plant, said heat exchanger assembly comprising:
  (a) a single housing;
  (b) means forming an inlet in said housing for recirculating hot reformed gases from a fuel reformer in the power plant in an inlet side of said housing;
  (c) means forming an outlet in said housing for exiting the reformed fuel gases from an outlet side of said housing;
  (d) means forming a flow path in said housing for the reformed fuel gases from said inlet side to said outlet side along which flow path the reformed fuel gases move through said housing;
  (e) first conduit means in said housing extending from said outlet side to said inlet side of said housing, said first conduit means being operable to direct raw hydrocarbon fuel through said housing from said outlet side to said inlet side in heat exchange relationship with the reformed fuel gases, and said first conduit means including means for exiting the raw hydrocarbon fuel from said housing at said inlet side thereof;
  (f) second conduit means in said housing extending between said outlet side of said housing to a medial portion of said housing between said outlet and inlet sides thereof, said second conduit means being operable to duct coolant water from the power plant power section through said housing from said outlet side thereof to said medial portion thereof in heat exchange relationship with the reformed fuel gases, said second conduit means including means for exiting the coolant water from said housing at said medial portion thereof; and
  (g) third conduit means in said housing extending from said medial portion of said housing to said inlet side of said housing, said third conduit means being operable to duct steam from said medial portion of said housing to said inlet side thereof in heat exchange relationship with the reformed fuel gases, and said third conduit means further including means for exiting the steam from said housing at said inlet side thereof; and
  (h) said heat exchanger assembly being operable to lower the temperature of the reformed fuel gases from reformer temperatures to fuel cell power section operating temperatures, to raise the temperature of the raw hydrocarbon fuel to reformer temperatures, to raise the temperature of the coolant water sufficiently to convert the coolant water to a two phase water-steam mixture, and to raise the temperature of the steam to reformer temperatures with all of the temperature changes occurring within said single housing.

5. The heat exchanger assembly of claim 4 further including heat exchange fin plates disposed in said flow path and interconnecting all of said first, second and third conduit means.

6. The heat exchanger assembly of claim 4 further comprising: a manifold and flow reversal chamber in said housing on one side of said flow path, which manifold and flow reversal chamber contains inlet and outlet manifolds and first flow reversal portions for said first, second and third conduit means; and a flow reversal chamber on the opposite side of said flow path in said housing containing second flow reversal portions of said first, second and third conduit means.

7. The heat exchanger assembly of claim 6 wherein said first and second flow reversal portions of said third conduit means comprise U-shaped portions of said third conduit means, said first flow reversal portions of said third conduit means being disposed in planes which are perpendicular to the planes in which said second flow reversal portions are disposed.

* * * * *

UNITED STATES PATENT AND TRADEMARK OFFICE
CERTIFICATE OF CORRECTION

PATENT NO. : 4,781,241

DATED : November 1, 1988

INVENTOR(S) : ROBERT MISAGE, GLENN W. SCHEFFLER, HERBERT J. SETZER, PAUL R. MARGIOTT and EDMUND K. PARENTI, JR.

It is certified that error appears in the above-identified patent and that said Letters Patent is hereby corrected as shown below:

Column 1, line 20, after "reforming" please insert --operation, the raw hydrocarbon fuel is preheated and--.

Column 2, line 61, after "phase" (second occurrence) please insert --38--.

Signed and Sealed this

Fourteenth Day of March, 1989

*Attest:*

DONALD J. QUIGG

*Attesting Officer*  *Commissioner of Patents and Trademarks*